United States Patent [19]

Herzl

[11] 4,329,880

[45] May 18, 1982

[54] VORTEX-SHEDDING FLOWMETER WITH TORSIONAL SENSOR MOUNTED ON TORQUE TUBE

[75] Inventor: Peter J. Herzl, Morrisville, Pa.

[73] Assignee: Fischer & Porter Co., Warminster, Pa.

[21] Appl. No.: 178,176

[22] Filed: Aug. 14, 1980

Related U.S. Application Data

[63] Continuation-in-part of Ser. No. 37,532, May 10, 1979, Pat. No. 4,262,544, which is a continuation-in-part of Ser. No. 13,557, Feb. 21, 1979, Pat. No. 4,226,117, which is a continuation-in-part of Ser. No. 944,624, Sep. 21, 1978, Pat. No. 4,181,020.

[51] Int. Cl.$^3$ .............................................. G01F 1/32
[52] U.S. Cl. ............................................. 73/861.24
[58] Field of Search ............ 73/861.21, 861.22, 861.24

[56] References Cited

U.S. PATENT DOCUMENTS

| | | | |
|---|---|---|---|
| 1,215,135 | 2/1917 | Fisher | 73/861.24 |
| 3,796,096 | 3/1974 | Sielaff | 73/861.24 |
| 3,927,566 | 12/1975 | Zanker | 73/861.24 |

FOREIGN PATENT DOCUMENTS

| | | | |
|---|---|---|---|
| 2842556 | 4/1980 | Fed. Rep. of Germany | 73/861.24 |
| 823684 | 11/1959 | United Kingdom | 73/861.24 |

*Primary Examiner*—Herbert Goldstein
*Attorney, Agent, or Firm*—Michael Ebert

[57] ABSTRACT

A vortex-shedding flowmeter capable of accurately measuring the flow rate of a liquid or gas even under extreme operating conditions. The fluid to be metered is conducted though a flow pipe having a shedder fixedly mounted therein. A sensor which is caused to oscillate at a rate proportionate to the flow rate of the fluid is torsionally supported downstream behind the shedder on a pivot axis normal to the flow axis of the pipe, the torsional support including a torque tube whose base is received within a bore in the pipe and is welded thereto and whose tip is welded to one end of the sensor to provide a closed structure preventing leakage of fluid from the pipe. The sensor oscillations are converted into corresponding electrical signals by an external torque transducer operatively coupled to the sensor by a sensor link assembly including a rod which extends coaxially into the torque tube and is welded to the tip thereof.

9 Claims, 5 Drawing Figures

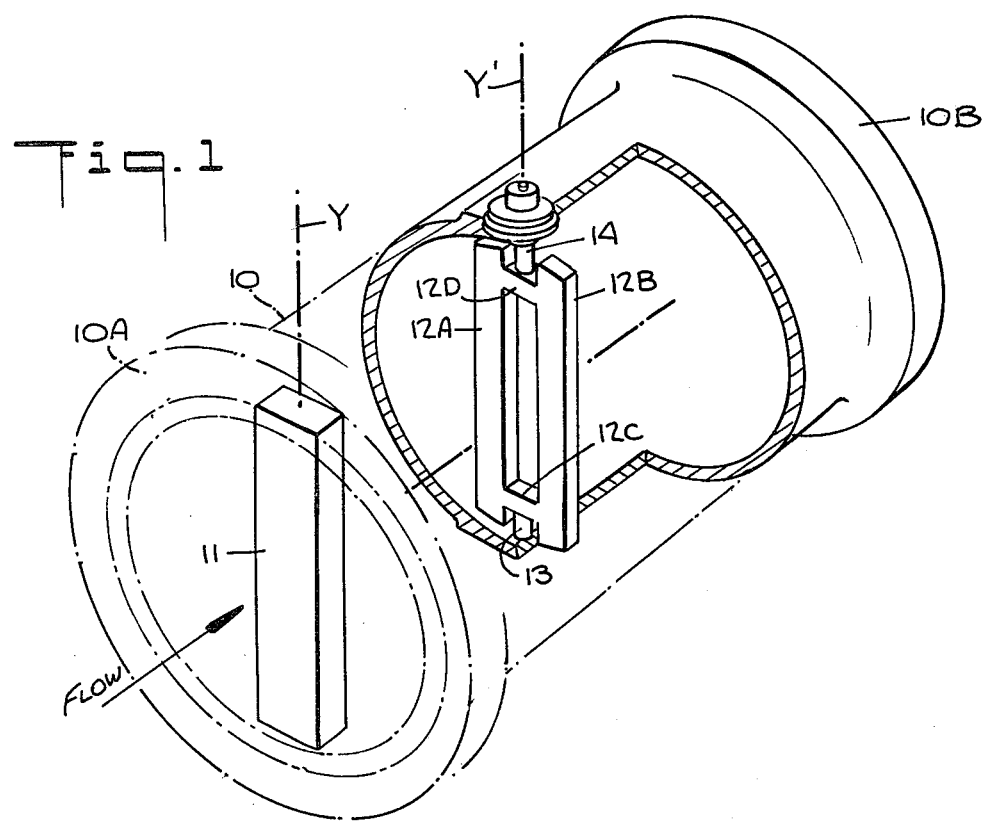
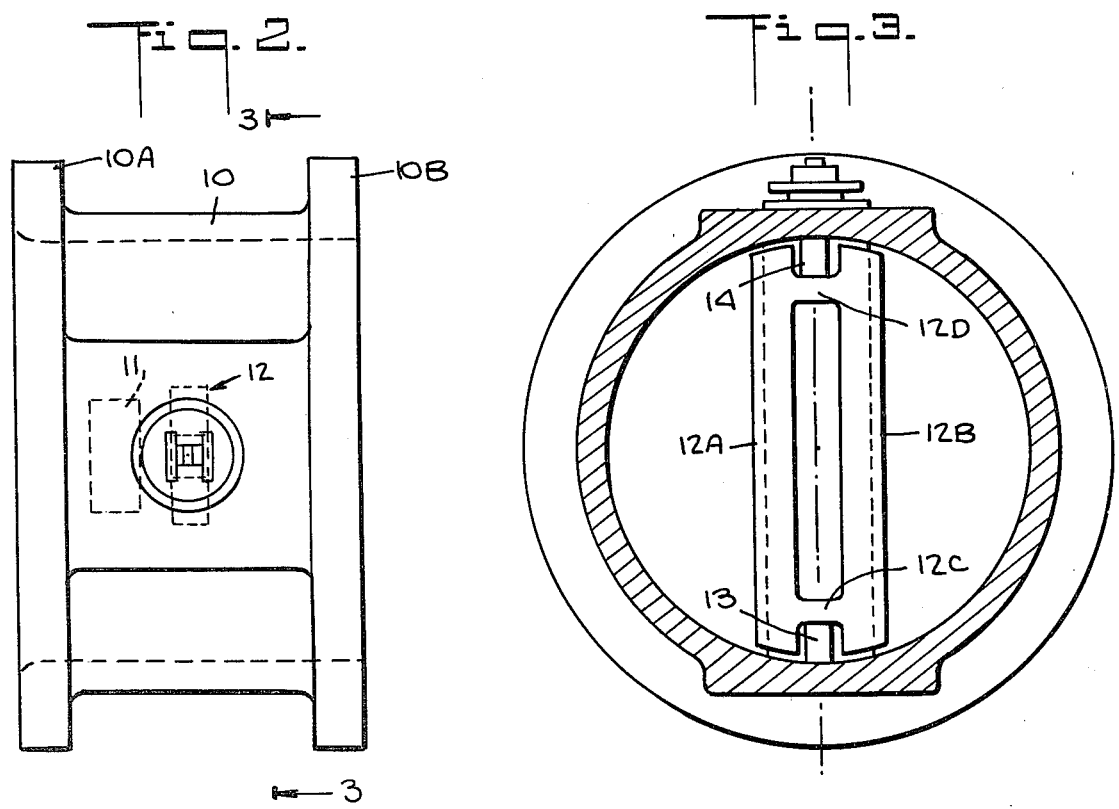

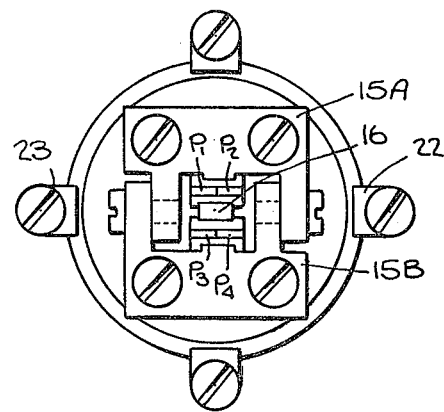
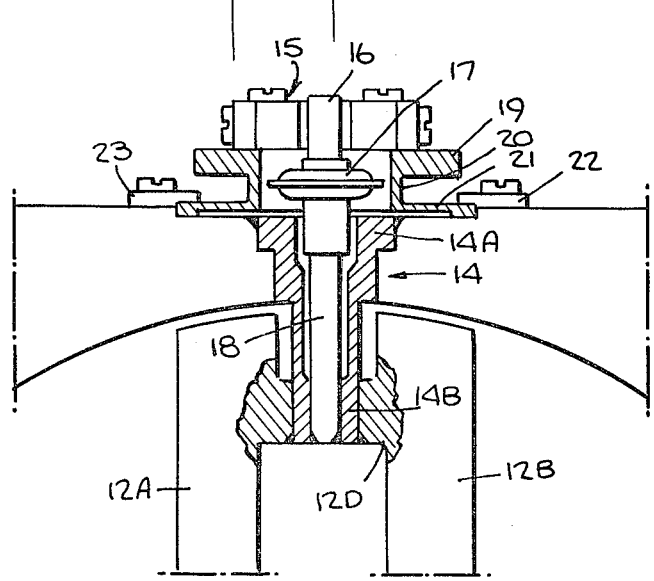

VORTEX-SHEDDING FLOWMETER WITH TORSIONAL SENSOR MOUNTED ON TORQUE TUBE

RELATED APPLICATIONS

This application is a continuation-in-part of my copending application (A) Ser. No. 037,532, filed May 10, 1979, now U.S. Pat. No. 4,262,544 entitled "Torque-Transducer for Vortex-Shedding Flowmeter Having Torsional Sensor," which is a continuation-in-part of my copending application (B), Ser. No. 013,557, filed Feb. 21, 1979, now U.S. Pat. No. 4,226,117 entitled "Vortex-Shedding Flowmeter Having Drag Actuated Torsional Sensor," which in turn is a continuation-in-part of my copending application (C), Ser. No. 944,624, filed Sept. 21, 1978, entitled "Vortex-Shedding Flowmeter Having A Sensing Vane" (now U.S. Pat. No. 4,181,020).

BACKGROUND OF INVENTION

This invention relates generally to vortex-shedding flowmeters, and more particularly to a flow meter of this type which includes a shedder producing vortices and a sensor torsionally-mounted within the flow pipe by a torque tube which is coupled by a sensor link assembly to an external torque transducer to generate an output signal whose frequency is proportional to the flow rate of the fluid being metered, the flowmeter being capable of accurately measuring the flow rates of liquids or gases even under extreme operating conditions.

It is well known that under certain circumstances the presence of an obstacle or shedder in a flow pipe will give rise to periodic vortices. For small Reynolds numbers, the downstream wake is laminar in nature, but at increasing Reynolds numbers, regular vortex patterns are formed which are known as Karman vortex streets. The frequency at which these vortices are shed is a function of flow rate.

This phenomenon is exploited to create a flowmeter for measuring the volumetric flow of fluids being treated or supplied in order to carry out various control functions. Flowmeters operating on this principle are disclosed in the Bird U.S. Pat. No. 3,116,639, and in the White U.S. Pat. No. 3,650,152. Flowmeters of the vortex-shedding type, such as those disclosed in the Burgess U.S. Pat. No. 3,888,120 and the Herzl U.S. Pat. No. 4,162,238, are capable of effecting accurate volumetric or mass flow measurement.

The above-identified copending patent application (C), whose entire disclosure is incorporated herein by reference, discloses a vortex-type flowmeter in which fluidic oscillations produced by a shedder mounted in a flow pipe are sensed by a downstream balanced-vane sensor pivoted in a torsional suspension that allows only microscopic vane motion. The shedder acts to divide the incoming fluid flowing therethrough and causes vortices to be shed alternately on either side thereof. The downstream train of vortices passing on either side of the vane sensor generates fluidic forces giving rise to alternate clockwise and counterclockwise torques, causing the sensor to oscillate mechanically at a frequency proportional to the flow rate of the fluid being metered.

The above-identified copending patent application (B), whose entire disclosure is incorporated herein by reference, discloses a vortex-shedding flowmeter wherein torsionally-supported behind the shedder is a drag-actuated sensor which includes a pair of parallel legs symmetrically disposed with respect to the longitudinal axis of the flow pipe.

With a drag-actuated sensor, as vortices are successively detached from the shedder and appear alternately on either side of the gap between the shedder and the downstream sensor, the low pressure region generated by each vortex acts to displace the stagnant zone produced in this gap as a result of fluid flow past the shedder to a position in front of the adjacent leg of the sensor, the fluid flow then going around and past the other leg, thereby developing a torque about the pivot axis. These torques are developed alternately, causing the torsionally-supported sensor to oscillate at a frequency in accordance with flow rate.

In both patent applications (B and C), the oscillatory motion of the torsionally-supported sensor is detected by means of a transducer which takes the form of a strain gauge bonded to a resilient beam, one end of which is attached to the trunnion or shaft of the sensor projecting through the flow pipe, the other end being anchored. The resultant deformation of the beam as the shaft oscillates is translated by the strain gauge into a corresponding electrical signal whose frequency is indicative of flow rate.

As pointed out in the earlier-filed copending patent applications, an important advantage of a vortex flowmeter having a torsionally-mounted sensor is that the meter is effective and accurate for both liquid and gas flow measurements. Though the vortex-type flowmeters disclosed therein represent a signficant advance over prior art vortex-type meters, such as those disclosed in the above-identified patents, their torque transducer arrangements have certain drawbacks and therefore fall short of an ideal arrangement.

The torque transducer arrangement disclosed in the above-identified patent application (A) closely approaches the ideal requirements for a sensing system constituted by a torque transducer associated with a torsionally-mounted sensor in a vortex-type flowmeter. These ideals are as follows.

A. The system has a sensitivity which renders the meter effective for low-pressure gas measurement.

B. The system is one which has an inherent ruggedness that renders the meter suitable for heavy-duty liquid flow rate measurement.

C. The system is insensitive to mechanical vibration and shock and acceleration forces to which the flowmeter is subjected.

D. The system is capable of operating over the broad temperature range normally encountered in gas and liquid measurement and is capable of operating over a very wide operating frequency range.

E. The sensing system requires virtually no motion and is not limited by torque transducer bonding or attachment problems.

F. Finally, the sensing system is one which is relatively inexpensive and has a compact structure.

In the torque transducer arrangement disclosed in application (A), the transducer cooperates with an extension of the shaft on which the torsionally-mounted sensor of the vortex meter is pivoted, the shaft extension having two flat parallel faces on opposing sides thereof. The transducer assembly is constituted by a first pair of parallel-connected piezoelectric elements lying in a common plane and interposed between one face of the shaft extension and a first pre-loading block, and a second pair of parallel-connected piezoelectric elements lying in a common plane and interposed between the opposite face of the shaft extension and a second pre-loading block, the movement of the extension being restricted by the pre-loaded elements to a degree whereby the extension is virtually motionless. The two pairs of parallel-connected elements are connected to output terminals and are so polarized in relation to the faces in the shaft extension that alternate clockwise and counterclockwise torques cause the interconnected elements to generate an alternating voltage of the same frequency.

In the vortex-shedding flowmeters disclosed in my earlier-filed applications (A), (B) and (C), the sensor in each instance is torsionally mounted on a shaft projecting through a bore in the flow pipe, the free end of the shaft being operatively coupled to an external transducer to convert the oscillatory motion of the sensor into a corresponding electrical signal. In order to prevent fluid leakage through the bore, the shaft therethrough is provided with an elastomeric seal made of neoprene or a material having similar elastomeric and physical properties.

While an elastomeric seal functions effectively under normal operating conditions even when corrosive fluids are being metered which are either very hot or very cold, it is not an acceptable seal under extreme conditions. Thus an elastomeric seal may break down under extremely high temperature operating conditions, such as those encountered with steam or liquid salts, or under extremely low temperature conditions involving cryogenic liquids such as liquid nitrogen or oxygen, or liquefied natural gas.

SUMMARY OF THE INVENTION

In view of the foregoing, the main object of this invention is to provide a vortex-shedding flowmeter in which a sensor torsionally-mounted within a flow pipe is caused to oscillate therein at a frequency proportional to the flow rate of the fluid being metered, the torsional mounting being such as to link the sensor to an external transducer in a manner dispensing with the need for an elastomeric seal whereby the integrity of the flow pipe is maintained and the meter is capable of operating efficiently, even under extreme conditions.

More particularly, an object of this invention is to provide a flowmeter of the above type whose sensor is torsionally mounted on a torque tube and including a piezoelectric torque transducer external to the flow pipe and a sensor link assembly coupling the transducer to the sensor by way of the torque tube.

Also an object of the invention is to provide a sensor link assembly which includes an isolator to render the transducer insensitive to the vibratory forces to which the sensor is subjected.

Yet another object of the invention is to provide a sensor link assembly which includes a coupling element that acts to alleviate bending and misalignment forces set up in the assembly and operation.

Briefly stated, these objects are accomplished in a vortex-shedding flowmeter capable of measuring the flow rate of a liquid or gas, even under extreme operating conditions. The fluid to be metered is conducted through a flow pipe having a shedder fixedly mounted therein. A sensor is torsionally supported downstream behind the shedder on a pivot axis normal to the flow axis of the pipe, the torsional support including a torque tube whose base is received within a bore in the pipe and is welded thereto, the tip of the tube being welded to one end of the sensor to provide a closed structure preventing leakage of the fluid the pipe.

In operation, as the incoming fluid stream is divided by and flows past the shedder, vortices are successively detached therefrom and appear alternately on either side of the sensor to develop alternating torques about the pivot axis, causing the sensor to oscillate at a rate proportional to the flow rate of the fluid. These oscillations are converted into corresponding electrical signals by an external torque transducer operatively coupled to the sensor by a link assembly including a rod which extends coaxially into the torque tube and is welded to the tip thereof.

OUTLINE OF DRAWINGS

For a better understanding of the invention as well as other objects and further features thereof, reference is made to the following detailed description to be read in conjunction with the accompanying drawings, wherein:

FIG. 1 is a schematic view, in perspective, of a vortex-shedding flowmeter which includes a sensing system constituted by a torsionally-mounted sensor and a torque transducer coupled thereto by a sensor link assembly in accordance with the invention;

FIG. 2 is an elevational view of the flowmeter;

FIG. 3 is a transverse section taken in the plane of line 3—3 in FIG. 2;

FIG. 4 is an enlarged detail of the section illustrated in FIG. 3; and

FIG. 5 is a plan view of the torque transducer.

DESCRIPTION OF INVENTION

Referring now to FIG. 1, there is shown a flowmeter of the vortex-shedding type which includes a sensing system in accordance with the invention. The meter is provided with a flow pipe 10 having end sealing faces 10A and 10B. In practice, flow pipe 10 which serves as the body of the meter is interposed in a process line carrying a liquid or gas whose flow is to be metered. The meter is clamped between the flanges of the upstream and downstream pipes of the line. Though the torsionally-mounted sensor included in this meter is of the type disclosed in the above-identified pending application (A), it is to be understood that the invention is also applicable to the sensors included in patent applications (B) and (C) or to any other torsionally-mounted sensor in a vortex-shedding flowmeter.

Mounted transversely within flow pipe 10 (shown as having a circular cross section) is a bluff body or shedder 11 having a generally square cross section. The long axis Y of the shedder is perpendicular to the longitudinal flow axis X of flow pipe 10. The incoming fluid stream which impinges on shedder 11 is divided thereby, producing fluidic perturbations in the form of a Karman vortex street. The shedder may be in any known form and may, for example, have geometries of the type disclosed in the above-identified patent applications and prior art patents.

Mounted transversely at a downstream position in flow pipe 10 behind shedder 11 is a drag-actuated torsional sensor 12 having the configuration of a generally rectangular frame provided with a pair of parallel legs 12A and 12B whose contoured ends follow the curvature of the flow pipe. Sensor 12 is pivotally supported by lower and upper torque tubes 13 and 14 which are attached to the cross pieces of the frame at the exact center thereof. The torque tubes lie on a pivot axis Y' that is parallel to axis Y and perpendicular to flow axis X. Sensor 12 is statically and dynamically balanced with respect to pivot axis Y', legs 12A and 12B being symmetrically arranged relative to this axis.

The lower torque tube 13 has its base welded to the inner wall of flow pipe 10 and its tip welded to the center of the lower cross piece 12C of sensor 12. The upper torque tube 14, as best seen in FIG. 4, is arranged so that its stepped base section 14A is received within a similarly-configured bore extending through the wall of flow pipe 10, the end of this base section being welded to the pipe. The tip section 14B of torque tube 14 is received within a bore at the center of the upper cross piece 12D of sensor 12, the end thereof section being welded to this cross piece.

Sensor 12 is operatively coupled to an external torque transducer, generally designated by numeral 15, by a sensor link assembly which serves to transmit the torsional motion of upper torque tube 14 to torque transducer 15. This transducer is preferably a balanced piezoelectric structure of the type disclosed in copending application A. The transducer includes a pair of sub-assemblies 15A and 15B each interposed between a stationary pre-loading block and a respective face of the rod extension 16 of the sensor link assembly, each sub-assembly including a pair of piezoelectric elements in side-by-side relation ($P_1$, $P_2$-$P_3$, $P_4$). Rod extension 16 is coupled by a coupler 17 to a main rod 18 which extends coaxially through torque tube 14 and is anchored in the tip section 14B of this tube and welded thereto.

Coupler 17 is formed by a pair of cup-shaped flexible diaphragms in face-to-face relation whose circular flanges are welded together to define a cell similar to that of an aneroid barometer. Torque transducer 15 is seated on the annular upper section 19 of an isolator which is joined by a cylindrical intermediate section 20 to an annular lower section 21, coupler 17 being disposed within the isolator. Lower section 21 is secured to flow pipe 10 by screwed clamps 22 and 23.

Transducer 15 detects the motion of sensor 12 as it oscillates about pivot axis Y' to produce a signal whose frequency is proportional to the flow rate of the fluid being metered. The torsional suspension of sensor 12 effected by torque tubes 13 and 14 limits pivot motion at maximum torque to a microscopic motion in the order of a half micron in either direction from the neutral position; hence the sensor is virtually motionless in operation.

In operation, the incoming fluid to be metered is divided by shedder 11 into two streams passing by the opposing edges of the shedder to produce vortices alternately on one side and then on the other side of the gap between shedder 11 and sensor 12 at a repetition rate proportional to the flow rate.

As a result of this shedding action, a moving train of vortices travels down the right side, and a moving train of vortices travels down the left side of flow tube 10. As the fluid streams flow past shedder 11, a stagnant zone is developed in the gap behind the shedder, which zone is initially aligned with the flow tube axis X.

When a single vortex appears on the right side of the flow tube adjacent the gap, this vortex creates a low pressure region that acts to displace the stagnant zone from tube axis X and to draw it in the direction of the low pressure region to a stable position in front of leg 12B of the rear sensor. As a consequence of such stagnant zone displacement, the incoming fluid is caused to flow around and past the other leg 12A and through the open passage between the legs. This action creates a drag on leg 12A and produces a torque about pivot axis Y' in the clockwise direction.

The situation is reversed for the succeeding vortex which appears on the left side of flow tube 10 adjacent the gap to develop a low pressure region which pulls the stagnant zone to a stable position in front of leg 12A. In this case, the incoming fluid is caused to flow around and past leg 12B and through the open passage between the legs to create a drag on leg 12B, producing a torque about pivot axis Y' in the counterclockwise direction. Thus the torsionally-mounted rear sensor is caused to oscillate about pivot axis Y' at a rate in accordance with the flow rate of the fluid being metered.

The sensor arrangement is inherently well balanced; for the structure thereof is essentially symmetrical with respect to its central pivot axis Y'. While a balanced sensor has obvious functional and structural advantages, it is particularly useful in gas metering; for the gas densities are much lower than liquid densities, resulting in much smaller vortex forces. And because the balanced sensor is pivoted in a torsional suspension that allows only microscopic motion, all motion being absorbed in the flexing component of the suspension, sticking problems are obviated.

In the meter arrangement, the torsional force created by the torsionally-mounted sensor 12 is applied to the outside of upper torque tube 14 which is welded to flow pipe 10. The resultant torsional motion of torque tube 14 is transmitted by main rod 18, coupler 17 and extension rod 16 of the sensor link assembly to the external piezoelectric torque transducer 15. Hence the present arrangement dispenses with the need for seals; for the integrity of the flow conduit is maintained by the welded torque tube structure.

However, though the present arrangement overcomes those problems which arise when using elastomeric seals, and makes it feasible to operate the flowmeter under extreme conditions of temperature, the seal-less arrangement creates a whole new series of problems which must be solved to render the meter effective as a practical flow rate measuring instrument.

To begin with, the torque tube must be strong enough to sustain internal flowmeter pressures and to withstand the forces generated at maximum fluid flow. At the same time, the torque tube must be sufficiently stiff to impart to sensor 12 a resonance frequency characteristic that is well above the maximum operating frequency of the meter in the anticipated range of fluid flow velocities. The reason for this latter requirement is that if the resonance frequency of the sensor lies in the vicinity of the maximum operating frequency of the flowmeter, the sensor will be excited into resonance, with highly disturbing effects on the output signal.

No problem is encountered in designing a torque tube made of steel or other suitable metal which satisfies these strength and stiffness requirements. On the other hand, the torque-sensing system must also be sensitive to low velocity fluid flows. A system which meets the criteria regarding strength and stiffness will inherently act to attenuate the forces reaching the torque transducer by several orders of magnitude.

While the gain of the electronic system which receives and processes the flow rate signal from the piezoelectric torque transducer can be raised to compensate for the attenuated signal resulting from the required stiff torque tube structure, background or noise signals originating from sources other than the flow of fluid through the flow pipe may give rise to an unfavorable signal-to-noise ratio; for now the noise component becomes large relative to the attenuated flow rate signal.

In order, therefore, to improve the signal-to-noise ratio, one must attenuate the noise component. But before we explain how coupler 17 and the isolator (19, 20 and 21) act to effect such attenuation, the sources of noise must first be considered. In a flowmeter of the type illustrated herein, torsionally-mounted sensor 12 is in relatively close proximity to the mounting faces 10A and 10B of flow pipe 12. Hence when flow pipe 10 is interposed in a flow line by bolting the flow pipe between the flanges of the upstream and downstream pipes of the line, very large forces are applied to faces 10A and 10B. And if the upstream and downstream pipes are included in an industrial process line subject to vibration, vibratory forces will be applied to the faces of the flow pipe flanges 10A and 10B.

If external torque transducer 15 were mounted directly on flow pipe 10, a significant percentage of the vibratory forces transmitted to this pipe would also be conveyed to the transducer and the noise component of the signal produced thereby would be very high. Although, as explained in copending application A, the balanced piezoelectric torque transducer 15 has a good signal rejection capability in the X, Y and Z planes, the unwanted noise generated by vibratory forces still attains an objectionable level in some cases. We shall now explain how these forces are attenuated.

It will be seen in the drawing that the upper annular section 19 of the isolator is relatively thick and therefore stiff. But the cylinder intermediate section 20 and the annular lower section 21 are deliberately made relatively thin and flexible. As a consequence, any microscopic deflection of the flow pipe due to external forces would cause deflection of these sections and would impart a relatively modest force on the upper section 19 of the isolator on which transducer 15 is mounted. In this way, there is reduced transmission of vibratory forces to the transducer and the noise component in the signal generated thereby is cut down.

With proper design of the isolator structure, the forces conveyed thereby to transducer 15 can be reduced to several orders of magnitude lower than those existing in the meter body. For example, the effectiveness of the lower deflectable section 22 of the isolator may be enhanced by giving it a convoluted or corrugated diaphragm configuration to more effectively absorb the forces applied thereto.

Moreover, the isolator structure plays a role in the thermal characteristics of the meter sensing system; for the thin lower and intermediate metal sections 21 and 20 define an extended path of poor thermal conductivity between the body of the meter (i.e., flow pipe 10) and transducer 15 mounted on upper section 19. This path functions to effectively isolate the transducer from rapid temperature transients and makes it possible for the transducer to operate nearly at ambient temperature despite its closeness to the meter body.

Coupling 17 in the sensor link assembly, which intercouples main rod 18 to extension rod 16, functions as a torsional force coupling which minimizes the effects of bending and misalignment forces. The coupler serves to decouple and thereby attenuate bending forces set up in the sensor link assembly when torque tube 14 is bent by forces acting on sensor 12, the coupler keeping these bending forces away from transducer 15.

Coupling 17 also plays a role in the thermal characteristics of the sensing system. As in the case of the isolator, coupling 17 acts to extend the thermal conduction path between sensor 12 and transducer 15, and in this way isolates the transducer from rapid temperature transients.

In addition, coupling 17 carries out an even more important function; for when rapid temperature changes occur in the flowmeter, torque tube 14 and the sensor link assembly may then temporarily assume different temperature levels. The resultant differential expansion caused by the transitory temperature difference would, in the absence of coupling 17, give rise to large forces which would be exerted on transducer 15. But with the coupling interposed between transducer 15 and torque tube 14, the differential expansion caused by a transitory temperature difference is largely absorbed by the coupling and therefore imposes no significant force on the transducer.

While there has been shown and described a preferred embodiment of a vortex-shedding flowmeter with torsional sensor mounted on torque tube in accordance with the invention, it will be appreciated that many changes and modifications may be made therein without, however, departing from the essential spirit thereof. Thus instead of a vortex-shedding flowmeter in which the fixed shedder and the torsionally-mounted sensor are separate and distinct from each other, the function and structure of these components may be combined in a common element; that is, a torsionally-mounted sensor having a shedder formation. In this instance, the sensor is caused to oscillate as a result of vortices detached from the body thereof, the shedder being mounted on torque tubes and being coupled by a link assembly to an external transducer in the manner described hereinabove.

I claim:

1. A vortex-shedding flowmeter capable of accurately measuring the flow rate of a fluid even under extreme conditions of temperature, the flowmeter comprising:

A. a flow pipe through which the fluid to be metered is conducted along a flow axis;

B. a shedder mounted in said pipe to intercept said fluid, vortices being detached from said shedder;

C. a sensor torsionally supported in said flow pipe along a pivot axis at right angles to the flow axis whereby said sensor is caused by said vortices to oscillate about said pivot axis at a rate proportional to flow, the support therefor including a torque tube whose base is received within a bore in said flow pipe and is joined thereto and whose tip is joined to one end of said sensor to exclude said fluid from the interior of said tube;

D. a transducer external to said pipe to convert the sensor oscillations into corresponding electrical signals; and E. a sensor link assembly coupling said sensor to said transducer and including a main rod extending into the interior of said torque tube and joined at one end to the tip thereof, the other end of said main rod being connected through a diaphragm coupler to an extension rod which is connected to said transducer, whereby the motion of the tube is transmitted via the rod to said transducer, said diaphragm coupler attenuating the transmission of bending forces imposed on said torque tube.

2. A flowmeter as set forth in claim 1, wherein said pipe is provided at its ends with mounting faces which are clampable between the end flanges of upstream and downstream pipes of a flow line conveying said fluid.

3. A flowmeter as set forth in claim 1, wherein said shedder is a body transversely mounted in said flow tube along an axis parallel to said pivot axis.

4. A flowmeter as set forth in claim 1, wherein said support further includes a second torque tube whose tip is joined to the sensor at the other end thereof and whose base is joined to the flow pipe.

5. A flowmeter as set forth in claim 4, wherein said torque tubes are fabricated of high strength metal and are relatively stiff.

6. A flowmeter as set forth in claim 5, wherein the stiffness of the torque tubes imparts a resonance characteristic to said sensor whose resonance frequency is well above the maximum frequency in the operating range of the flowmeter.

7. A flowmeter as set forth in claim 1, wherein said transducer is constituted by at least one piezoelectric crystal element interposed between one side of said extension rod and a stationary pre-loading block subjecting said element to compression.

8. A flowmeter as set forth in claim 1, wherein said transducer is seated on the upper annular section of an isolator which surrounds said coupler, said upper section being joined by a cylindrical intermediate section to an annular lower section secured to the outer surface of the flow pipe whereby said transducer is spaced from said pipe.

9. A flowmeter as set forth in claim 8, wherein the lower and intermediate sections of the isolator are relatively thin and flexible.

* * * * *